(12) United States Patent
Aoyama

(10) Patent No.: US 10,754,598 B2
(45) Date of Patent: Aug. 25, 2020

(54) PRINT CONTROLLER, NON-TRANSITORY COMPUTER-READABLE RECORDING MEDIUM STORING PRINT CONTROL PROGRAM AND PRINT CONTROL METHOD

(71) Applicant: KONICA MINOLTA, INC., Chiyoda-ku, Tokyo (JP)

(72) Inventor: Yasufumi Aoyama, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/400,104

(22) Filed: May 1, 2019

(65) Prior Publication Data

US 2019/0347053 A1 Nov. 14, 2019

(30) Foreign Application Priority Data

May 14, 2018 (JP) .................................. 2018-092708

(51) Int. Cl.
*G06F 3/12* (2006.01)
*G06K 15/02* (2006.01)

(52) U.S. Cl.
CPC ............ *G06F 3/125* (2013.01); *G06F 3/1208* (2013.01); *G06F 3/1292* (2013.01); *G06K 15/1822* (2013.01)

(58) Field of Classification Search
CPC ...... G06F 3/1208; G06F 3/1292; G06F 3/125; G06K 15/1822
USPC ........................................................ 358/1.18
See application file for complete search history.

(56) References Cited

U.S. PATENT DOCUMENTS

| 5,222,157 | A  | * | 6/1993 | Yoneda | ................ | H04N 1/2175 |
| | | | | | | 382/306 |
| 5,784,487 | A  | * | 7/1998 | Cooperman | ....... | G06K 9/00469 |
| | | | | | | 382/112 |
| 7,420,699 | B2 | * | 9/2008 | Farrell | .................. | G06F 3/1214 |
| | | | | | | 358/1.13 |
| 7,542,163 | B2 | * | 6/2009 | Kato | ...................... | H04N 1/203 |
| | | | | | | 358/1.18 |

(Continued)

FOREIGN PATENT DOCUMENTS

| JP | 2008035482 A | 2/2008 |
| JP | 2008210046 A | 9/2008 |

*Primary Examiner* — Allen H Nguyen
(74) *Attorney, Agent, or Firm* — Buchanan Ingersoll & Rooney PC

(57) ABSTRACT

Provided are a print controller for controlling print processing that divides a one-page document into page pieces and prints multiple page pieces per sheet, a non-transitory computer-readable recording medium and a print control method. As one embodiment, the print controller adjusts a layout of the page pieces, in which fields for the page pieces are arranged in multiple lines extending in the page-division direction, so as to reduce the number of the lines to one, and creates print data according to the adjusted layout. As another embodiment, a computing device for creating a print job for printing a one-page document, displays a screen showing candidates for a layout of the page pieces, including an adjusted layout, in which the number of lines of fields for the page pieces extending in the page-division direction are reduced to one, and creates a print job according to the layout selected on the screen.

15 Claims, 13 Drawing Sheets

(56) References Cited

U.S. PATENT DOCUMENTS

| | | | |
|---|---|---|---|
| 7,706,010 B2* | 4/2010 | Ko | G06F 3/1204 |
| | | | 358/1.15 |
| 8,824,798 B2* | 9/2014 | Kimura | G06K 9/00463 |
| | | | 382/112 |
| 9,348,443 B2* | 5/2016 | Oshima | G06F 3/041 |
| 2006/0193008 A1* | 8/2006 | Osaka | G06F 40/103 |
| | | | 358/1.18 |
| 2007/0076257 A1* | 4/2007 | Ahne | H04N 1/3876 |
| | | | 358/1.18 |

* cited by examiner

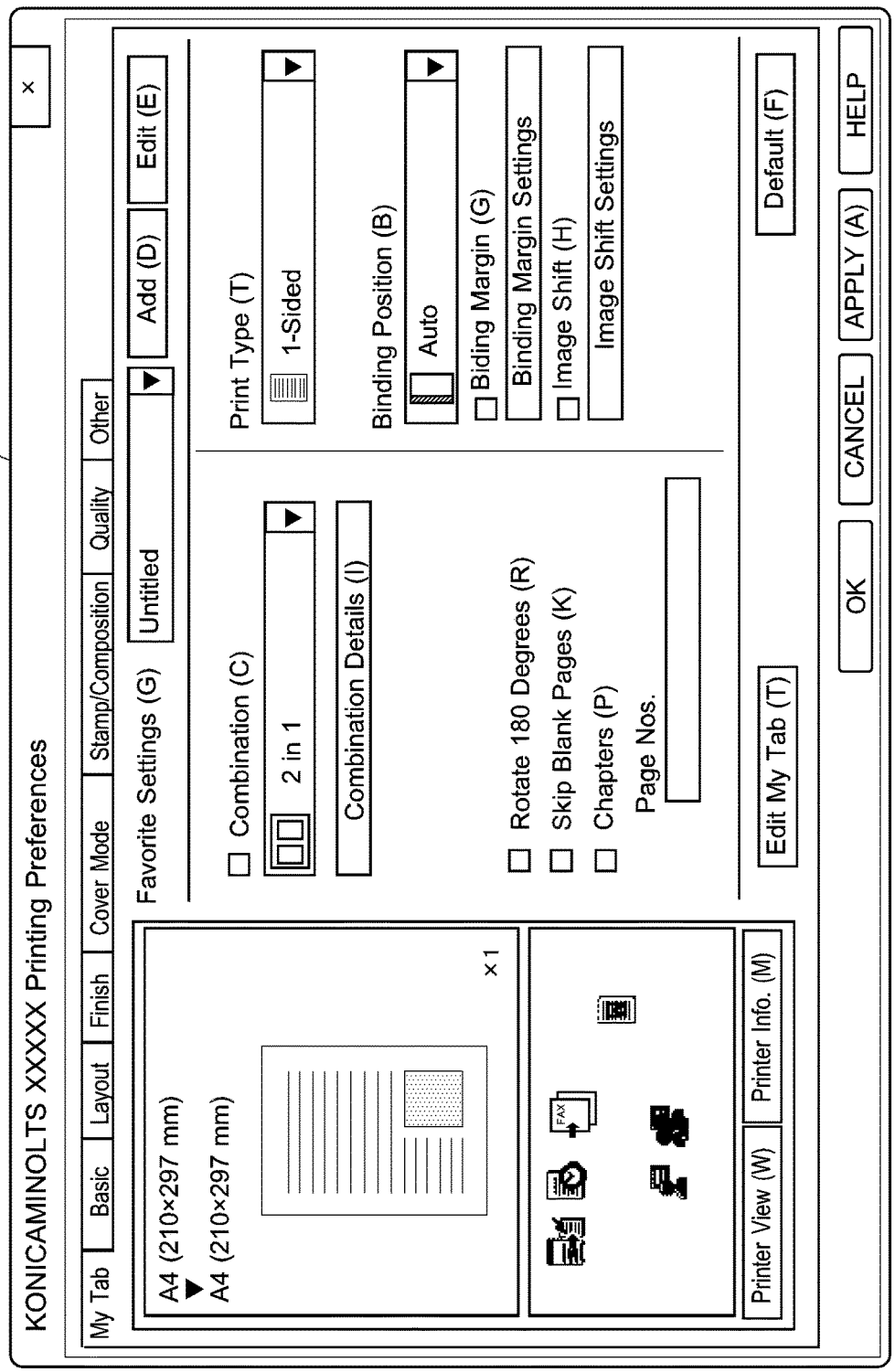

FIG. 11
RELATED ART
FIG. 12
RELATED ART
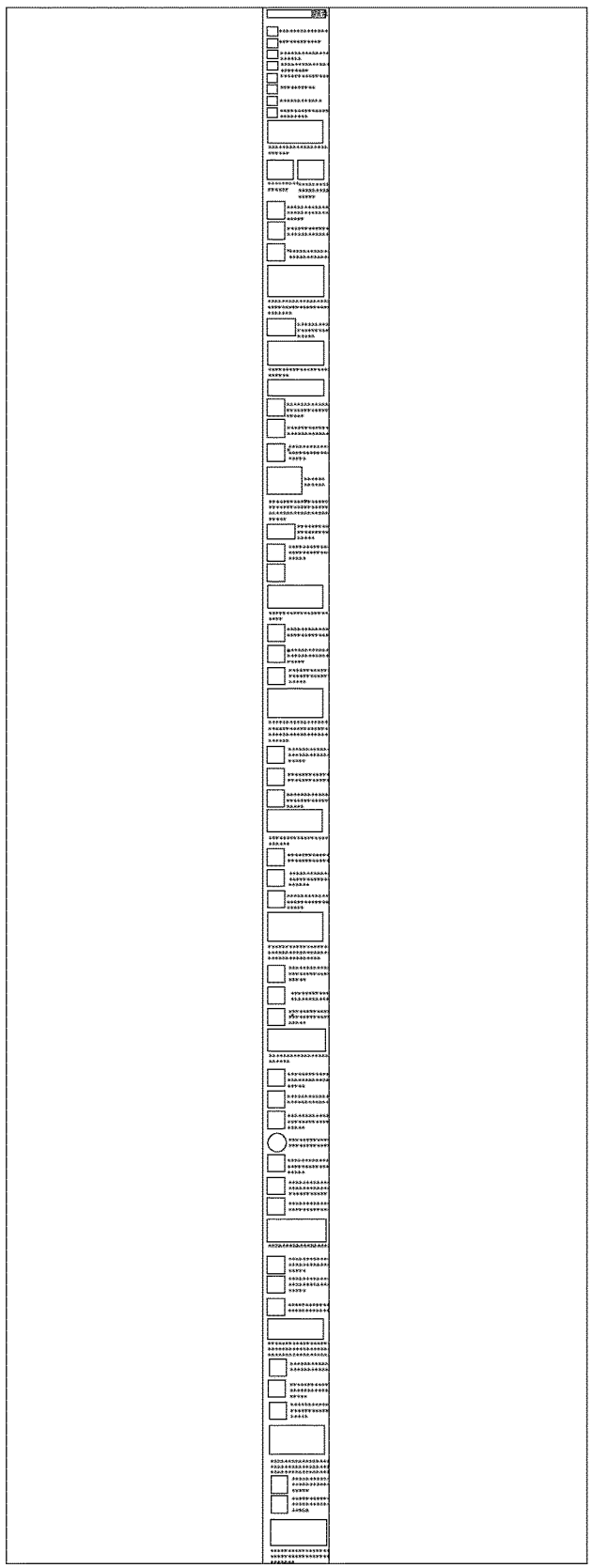
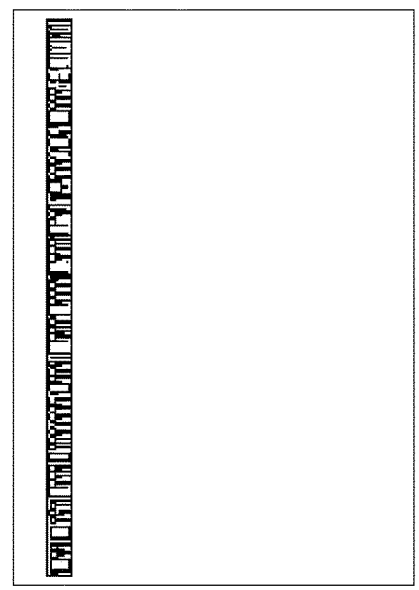

PRINT CONTROLLER, NON-TRANSITORY COMPUTER-READABLE RECORDING MEDIUM STORING PRINT CONTROL PROGRAM AND PRINT CONTROL METHOD

Japanese Patent Application No. 2018-092078 filed on May 14, 2018, including description, claims, drawings, and abstract, the entire disclosure of which is incorporated herein by reference in its entirety.

TECHNOLOGICAL FIELD

The present invention is directed to print controllers, non-transitory computer-readable recording media each storing a print control program and print control methods. In particular, the present invention is directed to print controllers for controlling print processing that divides a one-page document into multiple page pieces and prints a certain number of the page pieces per sheet of printing media, non-transitory computer-readable recording media each storing a print control program, and print control methods for use in a printing system.

BACKGROUND

When saving the contents of the currently viewed web page completely, browsers create a HTML (Hyper-Text Markup Language) file of the page itself and data of external contents of the page that are referenced in the HTML file. A person who received the file and data, can view and print the web page by using a browser. In other words, if the person wants to view and print the web page properly from the file and data, a browser needs to be installed in a computing device of the person.

In view of that, there have been developed tools capable of saving web pages as PDF (Portable Document Format) files so as to allow a user of a computing device in which no browser is installed, to view and print web pages. For example, the iOS mobile operating system developed by Apple Inc. is known, where Apple is a registered trademark or trademark of Apple Inc. in the United States and/or other countries, and iOS is a trademark or registered trademark of Cisco Systems, Inc. in the U.S. and other countries. Mobile computing devices running iOS 11, which was released on Sep. 20, 2017, or the successor of iOS 11, each has the capability of creating a PDF file from a web page in a browser (also referred to as the PDF creation capability). With this capability, users of the mobile computing devices running iOS 11 or later can save the entire web page displayed on the respective mobile computing devices as one PDF file that presents a one-page document reproducing the contents of the web page in the same layout as those displayed on the respective mobile computing devices.

In conventional print processing of a web page by using a PDF file created by the above-described PDF creation capability, because the PDF file presents a one-page document reproducing the whole web page, the page of the document is reduced in size so as to fit onto a certain-size sheet of paper loaded in a printer (for example, A4-size printing paper) and is printed on the sheet of paper. When the page of the document is very long in size, the contents of the printed page become extremely small so that a viewer of the printed page cannot read the contents, and the printed page is useless.

In view of that, methods of dividing a document into page pieces and printing the page pieces separately on several sheets of paper (so-called, poster printing) have been proposed. For example, Japanese Unexamined Patent Publication (JP-A) No. 2008-210046 discloses the following print control unit. The hardware processor of the print control unit inputs an image for printing, specifies the output size of the image, and specifies the size of printing media to be used for printing the image. The hardware processor then transforms the input image so as to fit to the output size. The hardware processor then uses the output size and the printing media size to calculate information about the way to divide the output-size plane. The hardware processor then uses the transformed image and the calculation result, to create data for printing the transformed image over several sheets of printing media.

As an example of methods of printing multiple pages per sheet of paper (so-called N-in-one or N-up printing), JP-A No. 2008-035482 discloses the following image processing apparatus. The image processing apparatus includes an image processor configured to generate print data on the basis of document data that are input; and a printing unit configured to print the print data on printing paper. In response to receiving instructions to print multiple pages of the document data per sheet of printing paper, the image processor obtains the magnification ratio of an area for printing one page of the document data with respect to the whole printable area of a sheet of printing paper, by using the number of pages to be printed on each sheet of printing paper, the width of margins set to surround the pages to be printed on each sheet of printing paper, and the size of the whole printable area. According to the magnification ratio, the image processor generates print data.

By using the poster printing, printers can print a one-long-page document over several sheets of printing paper, by dividing the long page into multiple page pieces. Thereby, users of the printers can obtain a printed document in the original size on a web browser or obtain a printed document in large size so that the users can easily read the contents of the printed document. However, when such a one-long-page document is printed in large size, just by using the poster printing, an increased number of sheets of printing paper are necessary for printing the document, and blank spaces appear on respective printed sheets. When such a one-long-page document is printed in large size so that the width of the page of the document fit to the width of sheets of paper, it results in that the contents of the printed document become too large, which makes the printed document less readable against the purpose of the printing.

On the other hand, by using the way to print multiple pages per sheets (N-in-one or N-up printing) together with the poster printing, printers can print a one-long-page document over a reduced number of sheets of printing paper, which is economical. In this combination printing, the page of the document is divided into multiple page pieces and a certain number of the page pieces are printed on each sheet of printing paper with the page pieces being spaced out. Therefore, the end part of each page piece in the printed sheets is hardly recognized by readers, and the contents of the printed document are separated into multiple pieces by spaces on each printed sheet, which makes the printed document less readable. Further, in the printed document given by the combination printing, the order of the page pieces printed on each sheet is hardly recognized by readers, which also makes the printed document less readable.

SUMMARY

The present invention is directed to print controllers, non-transitory computer-readable recording media each storing a print control program and print control methods, which realize printing of a one-page document by dividing the page of the document into multiple page pieces and printing a certain number of the page pieces per sheet of printing media, with reducing blank spaces located between the page pieces and enhancing readability of the printed document.

A print controller reflecting one aspect of the present invention is a print controller for controlling print processing that divides a one-page document into a plurality of page pieces and causes a print engine to print a certain number of the page pieces in a grid per sheet of printing media. The print controller comprising: a hardware processor; and a storage unit operatively connected to the hardware processor, storing a computer-readable program comprising instructions which, when executed by the hardware processor, cause the hardware processor to perform the following operations. The operations comprise, in response to receiving data of a one-page document, analyzing the data to obtain vertical size and horizontal size of the one-page document, and information specified for the one-page document. The information includes a page-division direction that is a direction in which the one-page document is to be divided into page pieces, and a layout to be used for printing a certain number of the page pieces in a grid per sheet of printing media. The operations further comprise performing a layout adjustment. The layout adjustment includes judging whether fields for the page pieces in the layout are arranged in two or more lines extending in the page-division direction; and on judging that the fields are arranged in two or more lines extending in the page-division direction, adjusting the layout so as to reduce the number of the two or more lines in the layout to one, to create an adjusted layout. The operations further comprise, according to the adjusted layout, creating print data for printing a certain number of page pieces, which are given by a division of the one-page document, per sheet of printing media, to output the print data.

A non-transitory computer-readable recording medium reflecting one aspect of the present invention stores a print control program to be executed in a printing system. The printing system includes a print controller for controlling print processing that divides a one-page document into a plurality of page pieces and causes a print engine to print a certain number of the page pieces in a grid per sheet of printing media. The program comprises instructions which, when executed by a hardware processor of the print controller, cause the hardware processor to perform the following operations. The operations comprise, in response to receiving data of a one-page document, analyzing the data to obtain vertical size and horizontal size of the one-page document, and information specified for the one-page document. The information includes a page-division direction that is a direction in which the one-page document is to be divided into page pieces, and a layout to be used for printing a certain number of the page pieces in a grid per sheet of printing media. The operations further comprise performing a layout adjustment. The layout adjustment includes judging whether fields for the page pieces in the layout are arranged in two or more lines extending in the page-division direction; and on judging that the fields are arranged in two or more lines extending in the page-division direction, adjusting the layout so as to reduce the number of the two or more lines in the layout to one, to create an adjusted layout. The operations further comprise, according to the adjusted layout, creating print data for printing a certain number of page pieces, which are given by a division of the one-page document, per sheet of printing media, to output the print data.

A print control method reflecting one aspect of the present invention is a print control method for use in a printing system. The printing system includes a print controller for controlling print processing that divides a one-page document into a plurality of page pieces and causes a print engine to print a certain number of the page pieces in a grid per sheet of printing media. The method comprises, in response to receiving data of a one-page document, analyzing, by a hardware processor of the print controller, the data to obtain vertical size and horizontal size of the one-page document, and information specified for the one-page document. The information includes a page-division direction that is a direction in which the one-page document is to be divided into page pieces, and a layout to be used for printing a certain number of the page pieces in a grid per sheet of printing media. The method further comprises performing a layout adjustment by the hardware processor. The layout adjustment includes judging whether fields for the page pieces in the layout are arranged in two or more lines extending in the page-division direction; and on judging that the fields are arranged in two or more lines extending in the page-division direction, adjusting the layout so as to reduce the number of the two or more lines in the layout to one, to create an adjusted layout. The method further comprises, according to the adjusted layout, creating, by the hardware processor, print data for printing a certain number of page pieces, which are given by a division of the one-page document, per sheet of printing media, to output the print data.

A non-transitory computer-readable recording medium reflecting one aspect of the present invention stores a print control program to be executed in a computing device for creating a print job for printing a one-page document by using page pieces, which are given by a division of the one-page document, to print a certain number of the page pieces in a grid per sheet of printing media. The program comprising instructions which, when executed by a hardware processor of the computing device, cause the hardware processor to perform the following operations. The operations comprise causing a display of the computing device to display a screen that allows an operator to specify, through an input device of the computing device, a layout to be used for printing a one-page document by using page pieces, which are given by a division of the one-page document, to print a certain number of the page pieces in a grid per sheet of printing media, wherein the screen shows candidates for the layout so that the operator can select through the input device one of the candidates as the layout to be used for printing the one-page document, and the candidates include a candidate prepared by adjusting another of the candidates, which is a layout in which fields for the page pieces are arranged in two or more lines extending in a page-division direction that is a direction in which the one-page document is to be divided, so as to reduce the number of the one or more lines in the layout to one. The operations further comprise, according to the layout selected by the operator though the input device, creating a print job for printing a certain number of page pieces, which are given by a division of the one-page document, per sheet of printing media, to output the print job.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIGS. 10A to 10C are diagrams illustrating an example of a print setup screen to be displayed by the client terminal according to the second embodiment;

FIG. 11 is a diagram illustrating an example of PDF data created from a web page;

FIG. 12 is a diagram illustrating a print given by outputting the PDF data of FIG. 11 using conventional printing;

DETAILED DESCRIPTION OF EMBODIMENTS

Hereinafter, one or more embodiments of the present invention will be described with reference to the drawings. However, the scope of the invention is not limited to the illustrated embodiments.

As described in the section of BACKGROUND, new features of iOS 11 include the capability of creating a PDF file from a web page in a browser. With this PDF creation capability, users of the mobile computing devices running iOS 11 or later can save the entire web page displayed on the respective mobile computing devices as a PDF file that presents a one-page document reproducing the contents of the web page in the same layout as those displayed on the respective mobile computing devices, as illustrated in FIG. 11. Conventional printing of the given PDF file results in a printed document in which the page of the one-page document is reduced in size so as to fit onto the size of printing paper. When the page of the document is very long in size, the contents of the printed page become extremely small so that a viewer of the printed page cannot read the contents, as illustrated in FIG. 12, and the printed page is useless.

Figure 13:
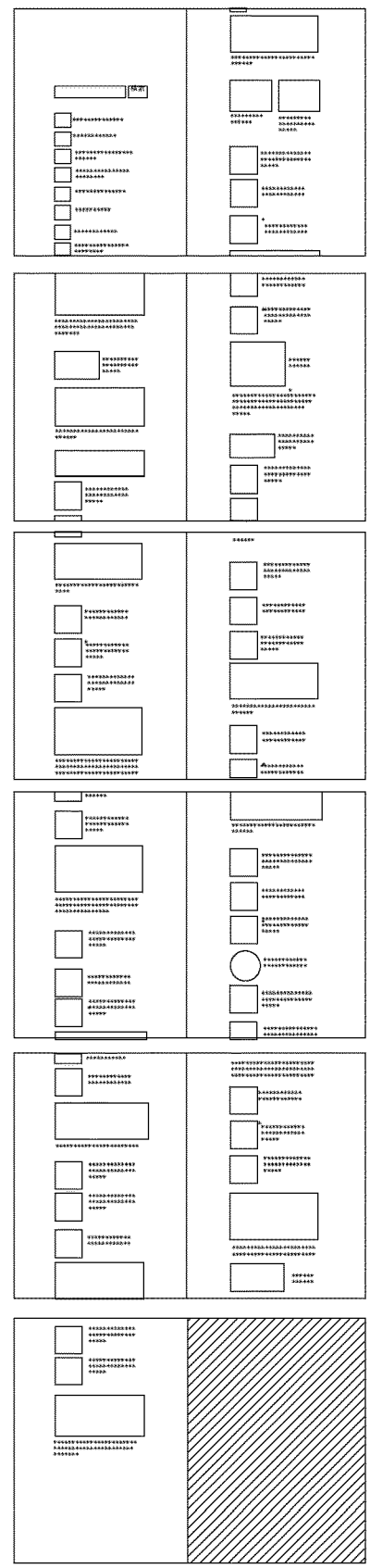
FIG. 13 is a diagram illustrating prints given by outputting the PDF data of FIG. 11 using poster printing.

To solve the problem, the poster printing can be used. That is, printers can print a one-page-document over several sheets of printing paper, by dividing the page of the document into multiple page pieces and printing the page pieces separately on multiple sheets of printing paper, in the original size of the document or in large size so that readers of the printed document can easily read the contents of the printed document. However, when such a one-page document is printed in large size, just by using the poster printing, an increased number of sheets of printing paper are necessary for printing the document, and blank spaces appear at both sides of each of printed page pieces, as illustrated in FIG. 13. On the other hand, when such a one-long-page document is printed in large size so that the width of the page of the document fit to the width of sheets of printing paper, it results in that the contents of the printed document become too large, which makes the printed document less readable.

Figure 14:
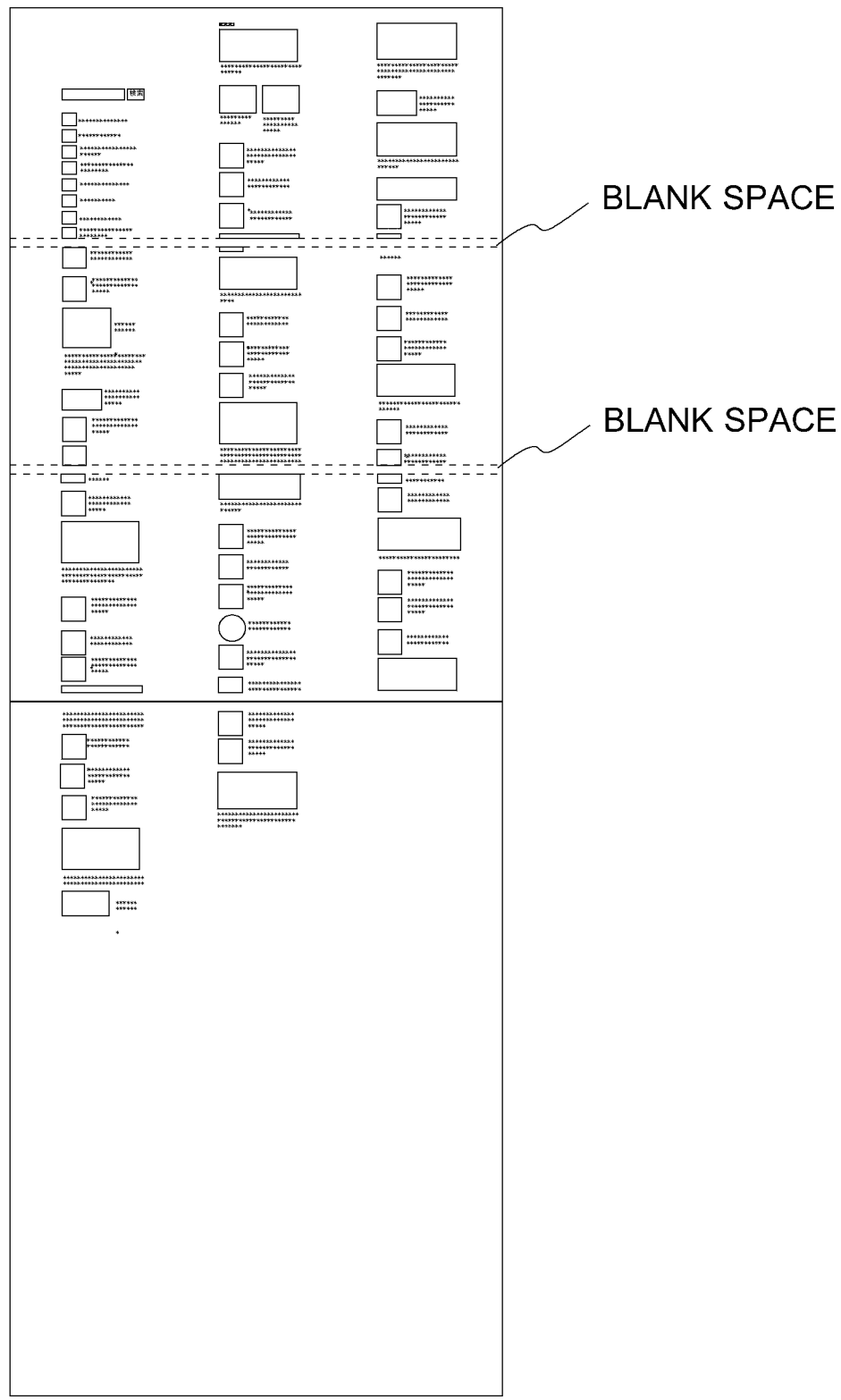
FIG. 14 is a diagram illustrating prints given by outputting the PDF data of FIG. 11 using the combination of poster printing and N-in-one printing.
Figure 15A:
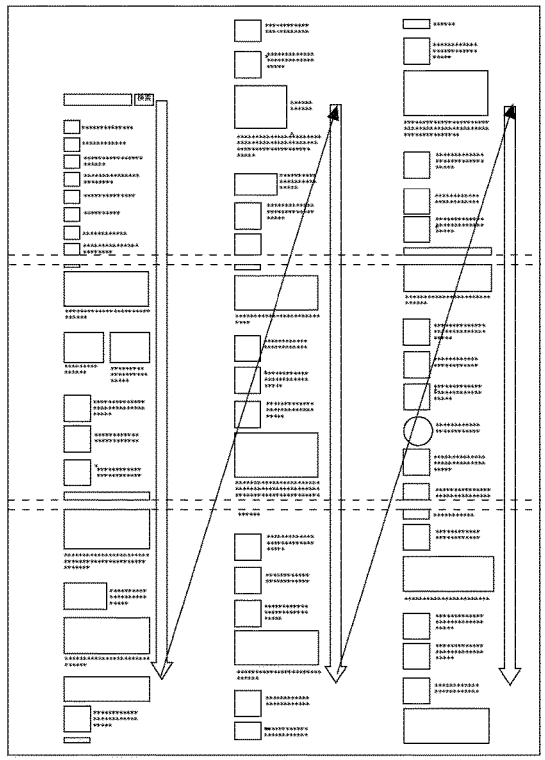
FIGS. 15A and 15B are diagrams illustrating two types of prints given by outputting the PDF data of FIG. 11 using the combination of poster printing and N-in-one (nine-in-one) printing.
Figure 15B:
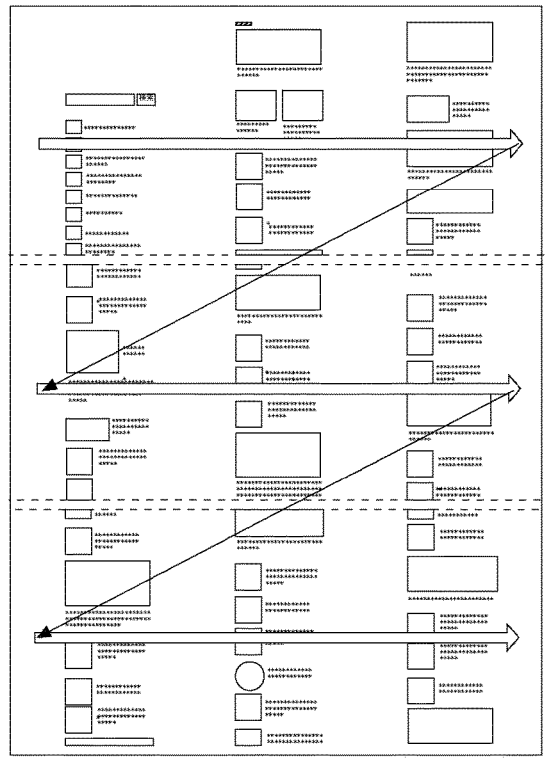

To reduce the blank spaces on the printed sheets, the combination of N-in-one (or N-up) printing and poster printing can be used. In this combination printing, as illustrated in FIG. 14, a page of the document is divided into multiple page pieces and a certain number of the page pieces are printed in a grid on each sheet of printing paper with the page pieces being spaced out. Therefore, the end part of each page piece in the printed sheets is hardly recognized by readers, and the contents of the printed document are separated into multiple pieces by blank spaces on each printed sheet, which makes the printed document less readable. Further, in the printed document given by the combination printing, the order of the page pieces printed on each sheet is hardly recognized by readers, which also makes the printed document less readable. Especially in a case that the page pieces are printed in a grid on each sheet so as to be arranged in order, in the cross-longitudinal direction of the document, it further worsens the readability of the printed document. In an example that a one-page document elongated in the vertical direction is printed by using the combination printing so that the page pieces are arranged in order in a grid on a sheet, first in the longitudinal direction of the document (the vertical direction of the figure), as illustrated in FIG. 15A, the printed document keeps a certain level of readability. In another example that a one-page document elongated in the vertical direction is printed by using the combination printing so that the page pieces are arranged in order in a grid on a sheet, first in the cross-longitudinal direction of the document (the horizontal direction of the figure), as illustrated in FIG. 15B (or a one-page document elongated in the horizontal direction is printed by using the combination printing so that the page pieces are arranged in order in a grid on a sheet, first in the vertical direction of the document), readers hardly recognize the order of printed page pieces on a sheet and the readability of the printed document deteriorate significantly.

In view of that, the following operations to control print processing is provided as an embodiment of the present invention. That is, in printing a one-page document by using the combination of N-in-one (or N-up) printing and poster printing, the following information specified for the document is checked: the way to divide the document (the page-division direction that is a direction in which the one-page document is to be divided into page pieces); and a layout to be used for printing a certain number of the page pieces in a grid (m×n) per sheet of printing paper or a N-in-one layout (with m rows and n columns). If fields for the page pieces in the layout are arranged in two or more lines extending in the page-division direction, the layout is adjusted so as to merge the fields for the page pieces to reduce the number of the two or more lines in the layout to one. In a case that the document is to be divided by one or more horizontal dividing lines into page pieces, the layout in which fields for the page pieces are arranged in two or more rows, is adjusted so as to reduce the number of the rows to one. That is, the grid of the fields for page pieces with m rows and n columns in the layout is changed into the grid of the fields for page pieces with one row and n columns. In another case that the document is to be divided by one or more vertical dividing lines into page pieces, the layout in which fields for the page pieces are arranged in two or more columns, is adjusted so as to reduce the number of the columns to one. That is, the grid of the fields for page pieces with m rows and n columns in the layout is changed into the grid of the fields for page pieces with m rows and one column.

In concrete terms, there is provided a print controller for controlling print processing that divides a one-page document into a plurality of page pieces and prints a certain number of the page pieces in a grid per sheet of printing media. The hardware processor of the print controller performs the following operations. In response to receiving data of a one-page document, the hardware processor analyzes the data, to obtain the vertical size and horizontal size of the one-page document (the document sizes), and information specified for the one-page document. The information includes the page-division direction that is a direction in which the one-page document is to be divided into page pieces (for example, the direction of one or more dividing lines to be used for dividing the one-page document), and a layout to be used for printing a certain number of the page pieces in a grid per sheet of printing media. The hardware processor judges whether fields for the page pieces in the layout are arranged in two or more lines extending in the page-division direction; and when judging that the fields are arranged in two or more lines extending in the page-division direction, adjusts the layout so as to merge the fields for the page pieces in the layout to reduce the number of the lines to one. The hardware processor then creates print data for printing the document, according to the adjusted layout, and outputs the print data. In other words, the hardware processor uses page pieces, which are given by a division of the one-page document according to the adjusted layout, and creates print data for printing a certain number of the page pieces per sheet of printing media. In the creation of the print data, the hardware processor may calculate an aspect ratio of the fields for the page pieces in the adjusted layout, determine positions to divide the one-page document into page pieces, on the basis of the aspect ratio, and divide the one-page document at the positions, to create the print data. Before adjusting the layout, the hardware processor may cause a display to display a selection screen that prompts an operator to make through an input device a selection whether to adjust the layout specified for the one-page document; and in response to receiving the operator's selection made through the input device, may perform the adjustment of the layout. When analyzing the data, the hardware processor may use the document sizes, to specify one or both of the page-division direction and the layout, for the one-page document.

As another embodiment, there are provided the following operations of a computing device for creating a print job for printing a one-page document by using page pieces, which are given by a division of the one-page document, to print a certain number of the page pieces in a grid per sheet of printing media. The hardware processor of the computing device causes a display of the computing device to display a screen that allows an operator to specify, thorough an input device of the computing device, a layout to be used for printing a one-page document by using page pieces, which are given by a division of the one-page document, to print a certain number of the page pieces in a grid per sheet of printing media. The screen shows candidates for the layout so that the operator can select one of the candidates as the layout to be used for printing the one-page document, and the candidates include a candidate prepared by adjusting another of the candidates, which is a layout in which fields for the page pieces are arranged in two or more lines extending in a page-division direction that is a direction in which the one-page document is to be divided, so as to reduce the number of the one or more lines in the layout to one. The hardware processor then create a print job for printing the document according to the layout selected by the operator through the input device, and outputs the print job. In other words, the hardware processor creates a print job for printing a certain number of page pieces, which are given by a division of the one-page document, per sheet of printing media, according to the layout selected by the operator, and outputs the print job.

As descried above, in printing a one-long-page document by the combination of the poster printing and the N-in-one printing, by using the layout to be used for printing a certain number of page pieces in a grid per sheet of printing media, the layout is checked whether fields for the page pieces in the layout are arranged in two or more lines extending in the page-division direction (rows or columns), and is adjusted to reduce the number of the rows or columns to one. It reduces blank spaces located between the page pieces on each printed sheet and enhances the readability of the printed document.

First Embodiment

Figure 1:
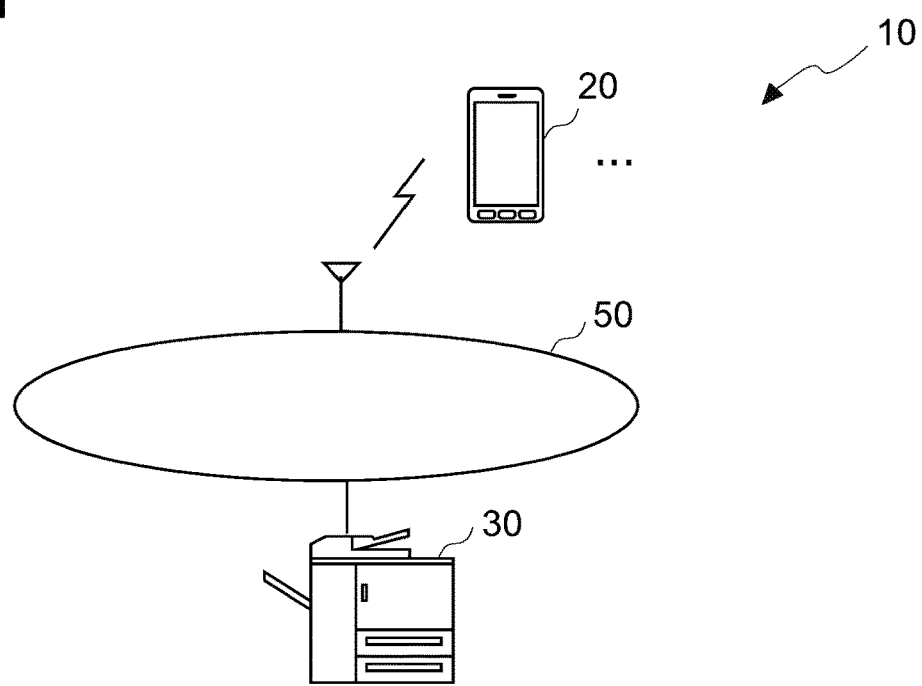
FIG. 1 is a schematic diagram illustrating an example of the constitution of a printing system according to the first embodiment.
Figure 2:
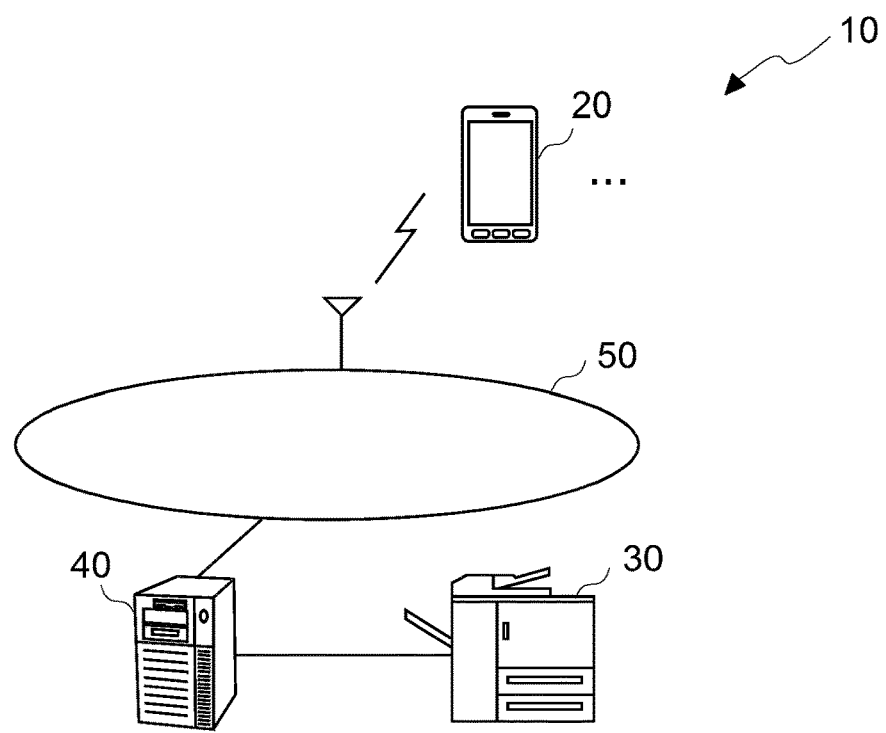
FIG. 2 is a schematic diagram illustrating another example of the constitution of a printing system according to the first embodiment.
Figure 4A:
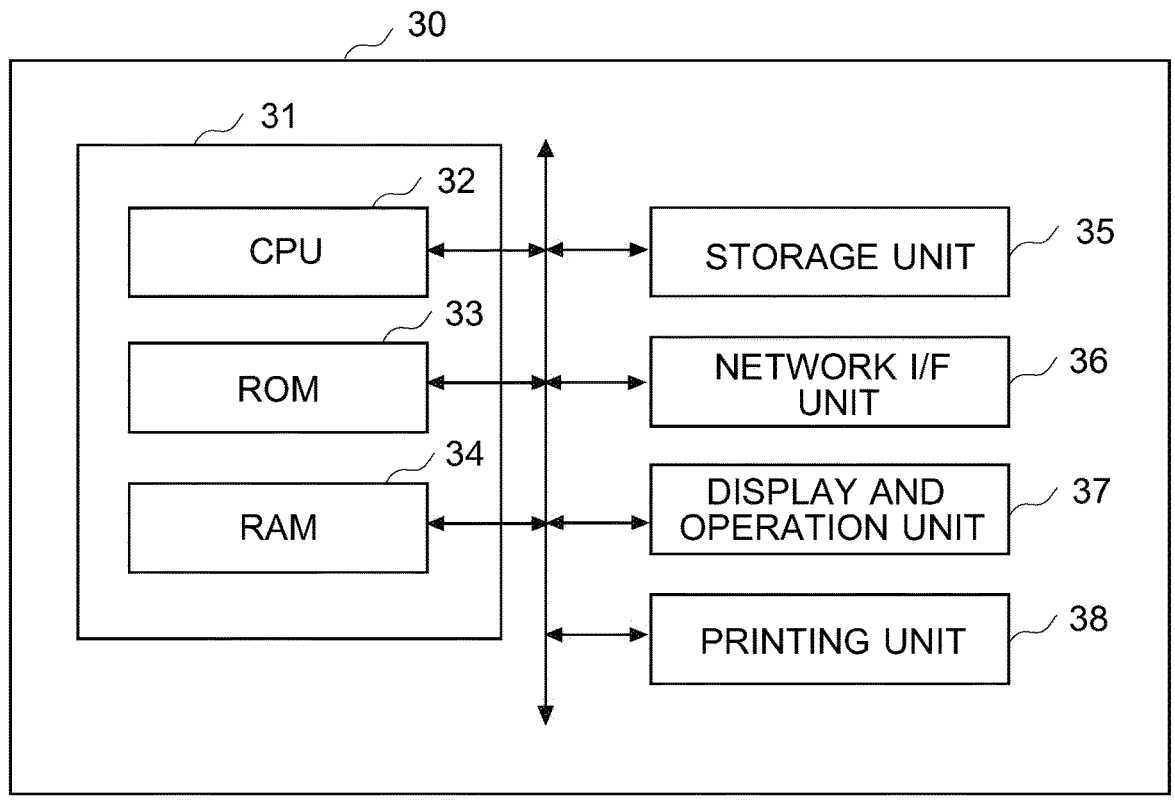
FIGS. 4A and 4B are block diagrams illustrating an example of the constitution of a printing device in the printing system according to the first embodiment.
Figure 4B:
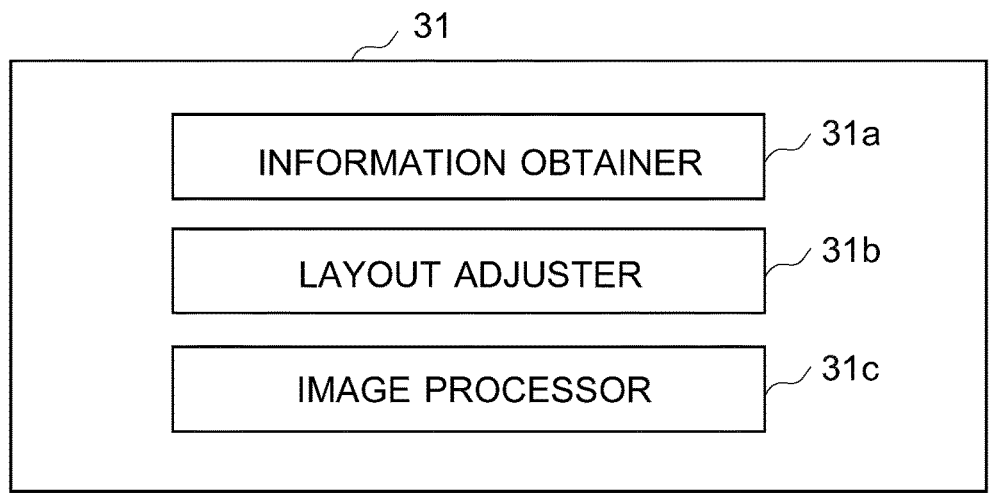
Figure 5:
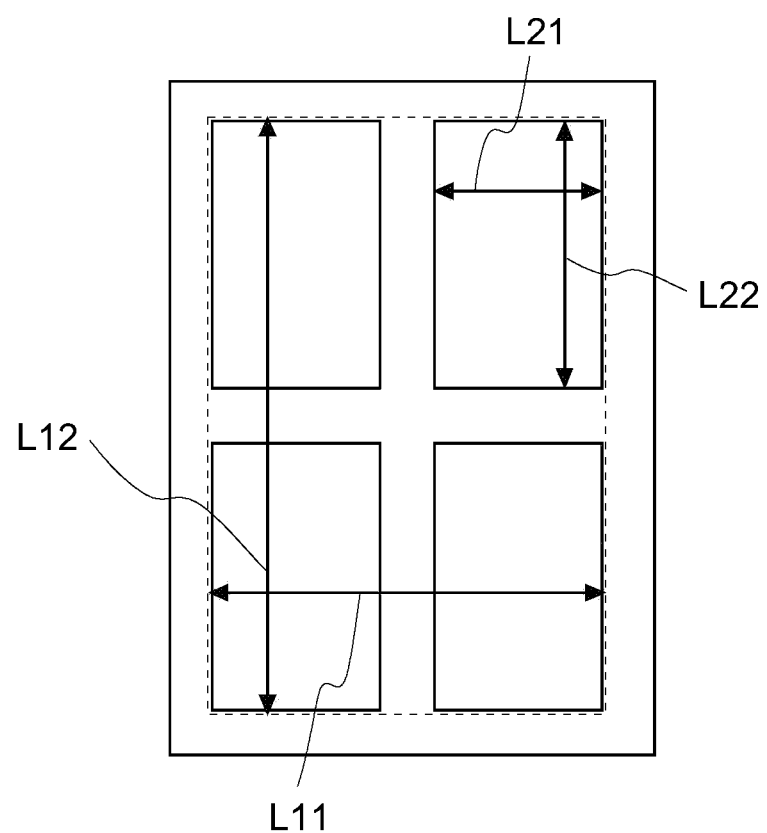
FIG. 5 is a diagram illustrating a printable area of a sheet of printing paper and fields for printing logical pages, for use in N-in-one printing.
Figure 6:
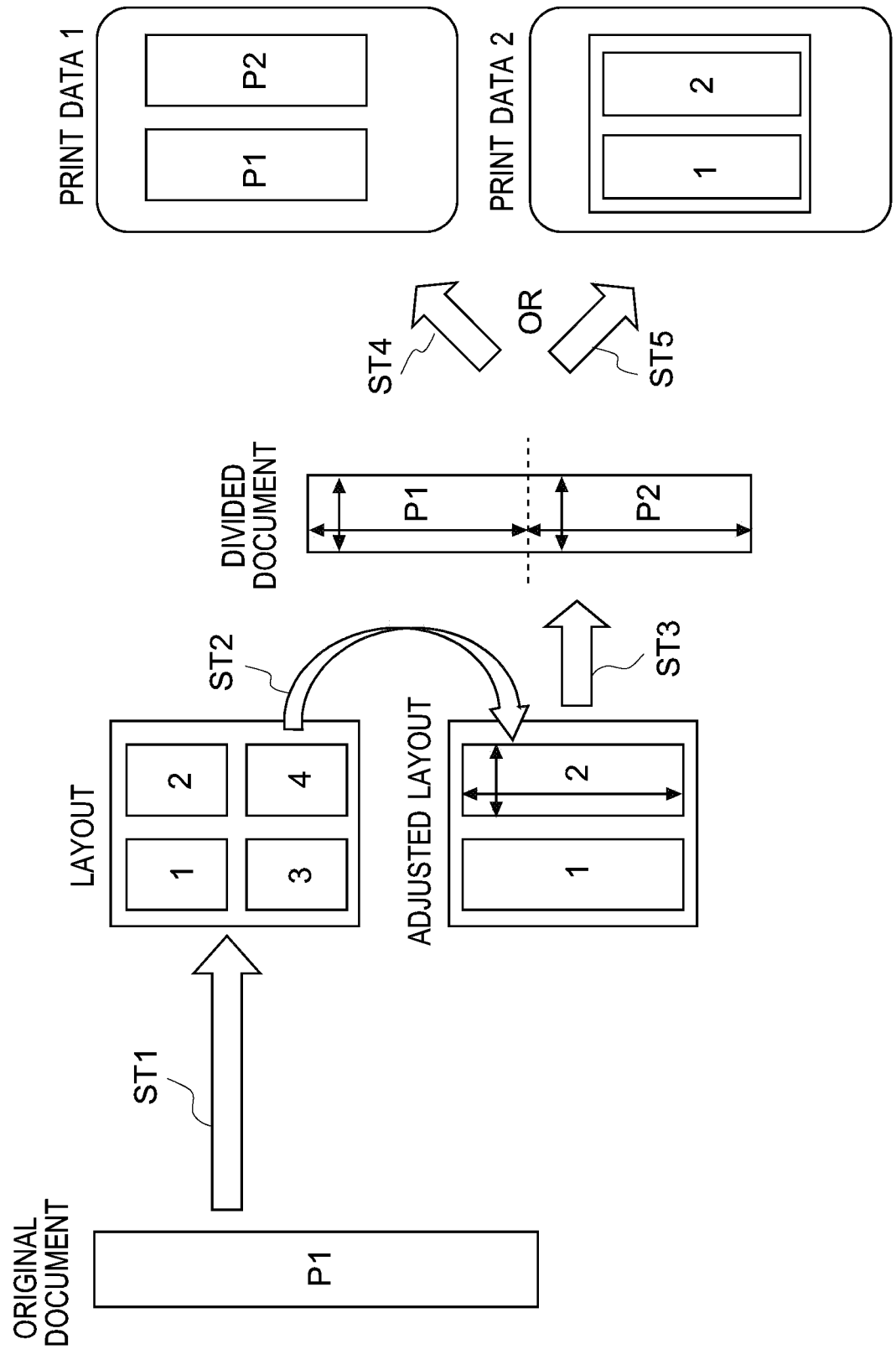
FIG. 6 is a schematic diagram illustrating an example of the print control method according to the first embodiment.
Figure 7:
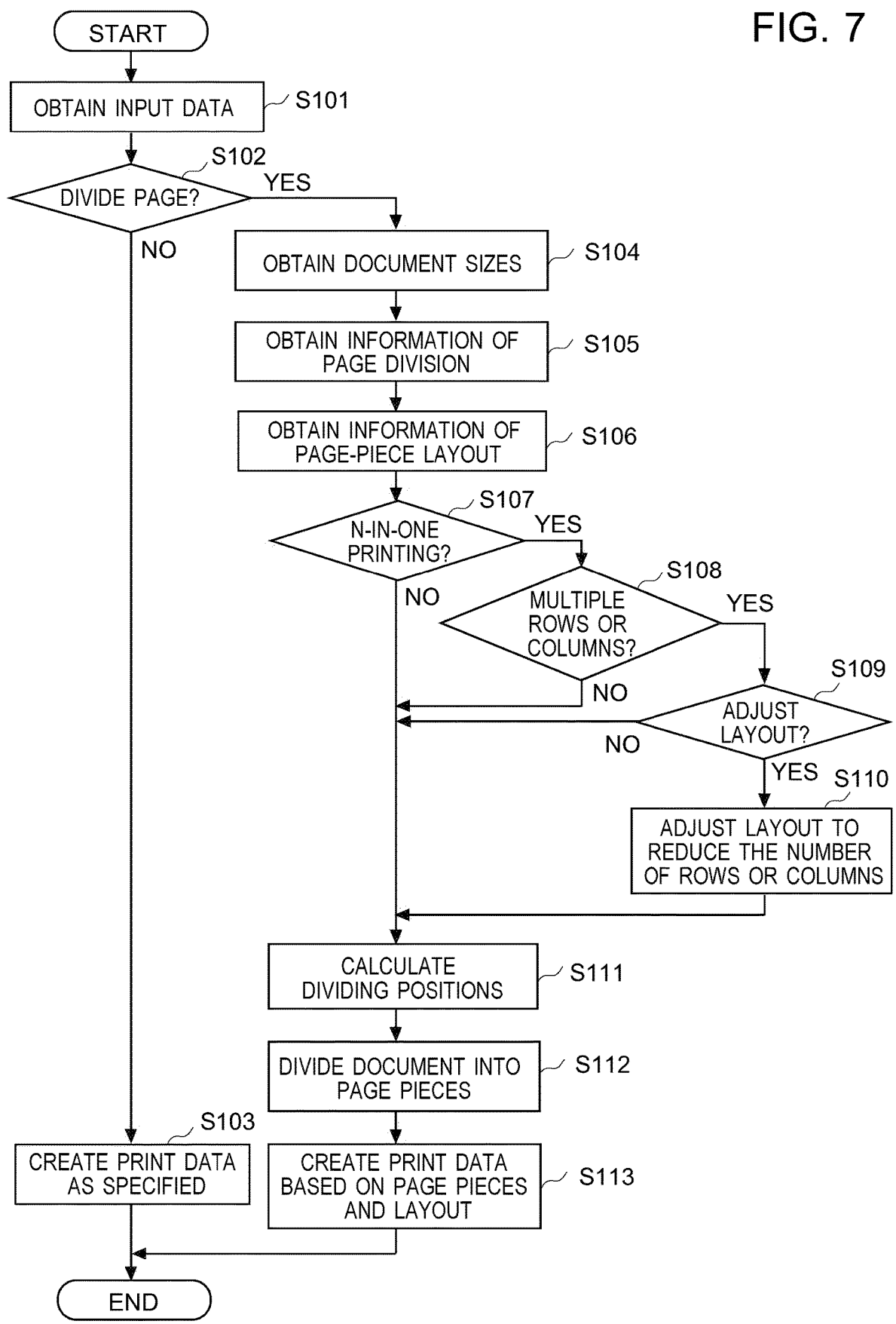
FIG. 7 is a flowchart illustrating an example of operations of the printing device according to the first embodiment.
Figure 8A:
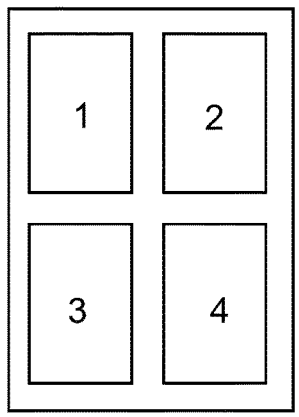
FIGS. 8A to 8C are diagrams illustrating examples of an original N-in-one layout and an example of an adjusted N-in-one layout, for use in the print control method according to the first embodiment.
Figure 8B:
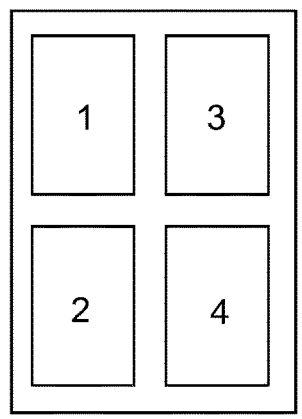
Figure 8C:
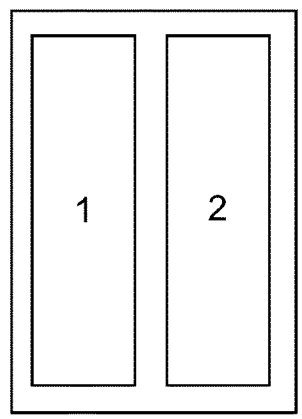
Figure 9:
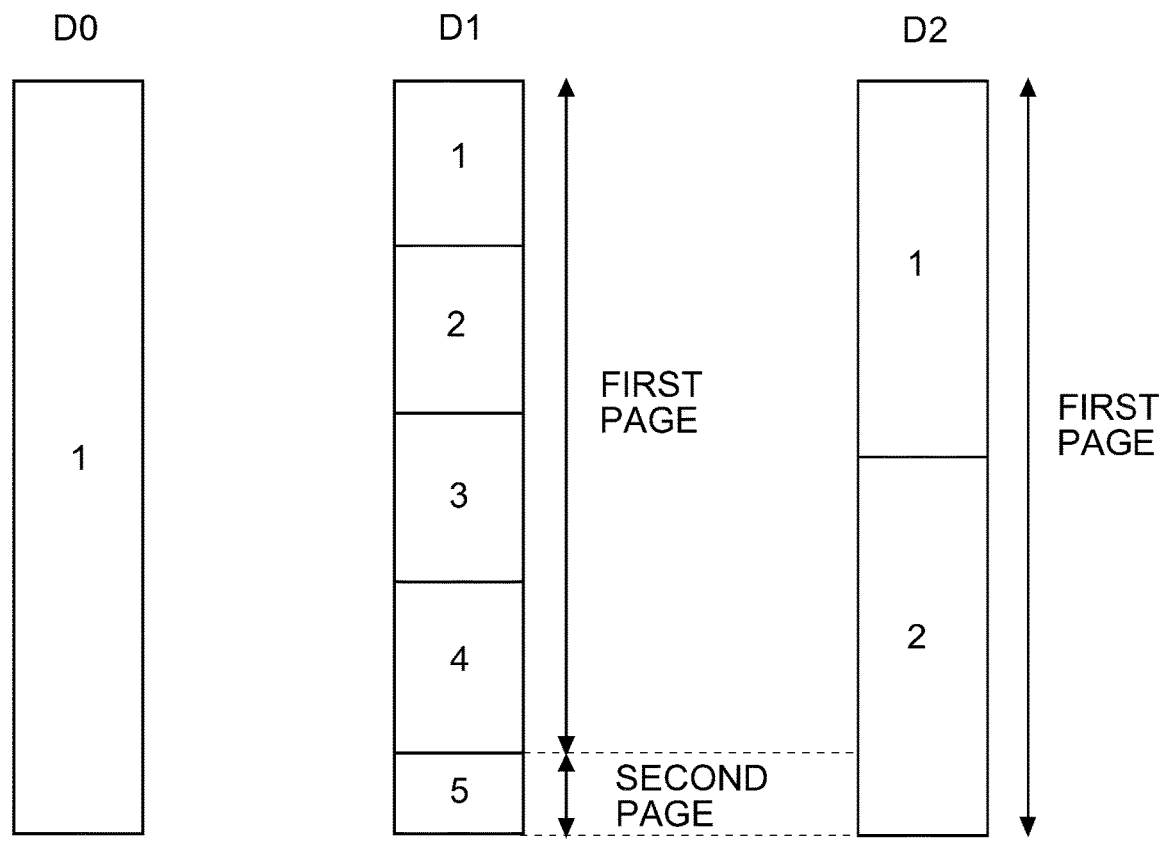
FIG. 9 is a diagram illustrating effects of the print control method according to the first embodiment.

In order to describe an embodiment of the present invention in more in detail, a description is given of a print controller, a non-transitory computer-readable recording medium storing a print control program and a print control method according to the first embodiment, with reference to FIG. 1 through FIG. 9. Each of FIG. 1 and FIG. 2 is a schematic diagram illustrating an example of the constitution of a printing system according the present embodiment. FIGS. 3A and 3B and FIGS. 4A and 4B are block diagrams illustrating an example of the constitution of a client terminal and a printing device in the printing system according to the present embodiment. FIG. 6 is a schematic diagram illustrating an example of the print control method according to the present embodiment. FIG. 7 is a flowchart illustrating an example of operations of the printing device according to the present embodiment. FIGS. 8A to 8C are diagrams illustrating examples of an original N-in-one layout and an example of an adjusted N-in-one layout, for use in the print control method according to the present embodiment. FIG. 9 is a diagram illustrating effects of the print control method according to the present embodiment.

As illustrated in FIG. 1, printing system 10 according to the present embodiment includes at least one client terminal 20 configured to create PDF data, and printing device 30 configured to perform printing on the basis of the PDF data received from client terminal 20. The at least one client terminal 20 and the printing device 30 are communicably connected to each other through communication network 50, where examples of the communication network 50 include a LAN (Local Area Network) and WAN (Wide Area Network) defined by specifications, such as Ethernet, Token Ring and FDDI (Fiber-Distributed Data Interface).

Though printing system in FIG. 1 is composed of at least one client terminal 20 and printing device 30, the printing system 10 may further includes controller 40 (print controller) for controlling printing device 30, as illustrated in FIG. 2. In this printing system 10, printing device 30 and controller 40 may be communicably connected to each other with an exclusive line supporting, for example, PCI (Peripheral Component Interconnect) communication. In another type of printing system 10 in which printing device 30 is configured to print PDF data that were prepared and recorded in printing system 10 in advance, the at least one client terminal 20 may be omitted. Hereinafter, a description of each apparatus of printing system 10 is given on the assumption of the constitution of printing system 10 illustrated in FIG. 1, by using an example of print processing that client terminal 20 creates PDF data and printing device 30 adjusts the N-in-one layout specified for the PDF data and then prints the PDF data according to the adjusted layout.

Figure 3A:
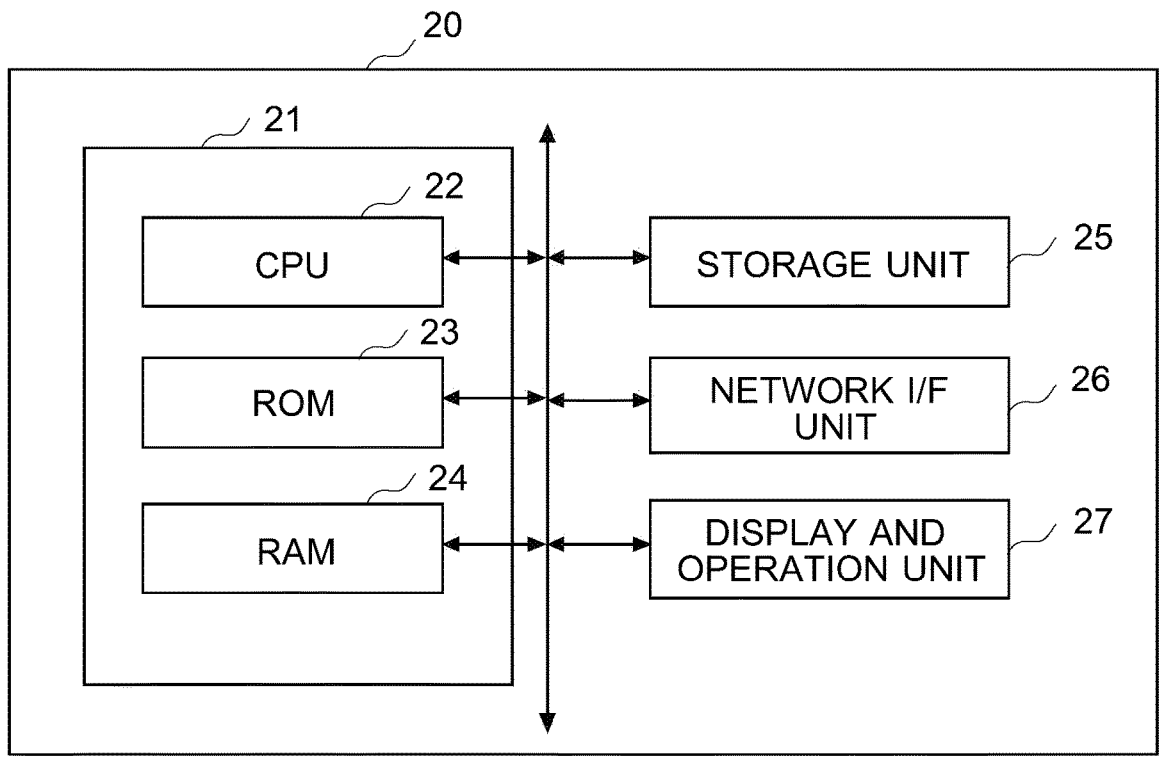
FIGS. 3A and 3B are block diagrams illustrating an example of the constitution of a client terminal in the printing system according to the first embodiment.

Client Terminal:

Client terminal 20 is a computing device configured to create data of a one-page document, like PDF data presenting a one-page document created from a web page, and send the PDF data to printing device 30. Client terminal 20 includes, as illustrated in FIG. 3A, built-in controller 21, storage unit 25, network interface (I/F) unit 26, display and operation unit 27.

Figure 3B:
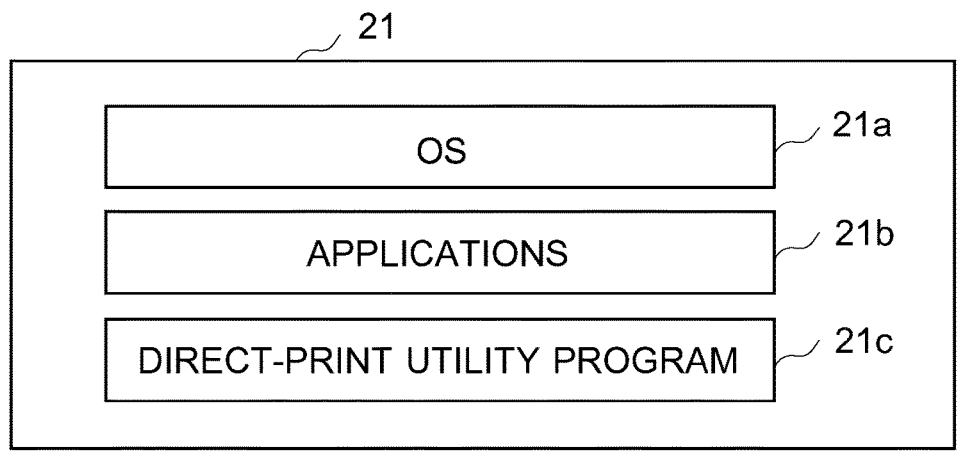

Built-in controller 21 includes CPU (Central Processing Unit) 22, and memories including ROM (Read Only Memory) 23 and RAM (Random Access Memory) 24. CPU 22 reads out control programs stored in ROM 23 or storage unit 25, loads the programs onto RAM 24, and executes the programs, thereby controlling operations of the components of client terminal 20. As illustrated in FIG. 3B, built-in controller 21 (CPU 22) is configured to execute OS (Operating System) 21a, applications 21b and direct-print utility program 21c.

OS 21a is an operating system, like iOS 11 or later, that has the PDF creation capability. OS 21a manages applications 21b and direct-print utility program 21c in client terminal 20 so as to function and run the programs. Alternatively, another operating system, such as Microsoft Windows or Android, may be used, if it has the capability equivalent to the PDF creation capability of iOS, where Microsoft and Windows are either registered trademarks or trademarks of Microsoft Corporation in the United States and/or other countries, and Android is a registered trademark or trademark of Google Inc. in the United States and/or other countries.

Applications 21b include a web browser for accessing information on the World Wide Web (a web page) and displaying the web page on a user's device. The web browser uses the PDF creation capability of OS 21a to convert the currently viewed web page into PDF data that present a one-page document, and then outputs the PDF data.

Direct-print utility program 21c is a program that, when being executed, causes built-in controller 21 to monitor a certain folder in a storage unit in client terminal 20, and in response to finding PDF data stored in the folder, send the PDF data to printing device 30 to instruct printing device 30 to perform direct printing using the PDF data. As needed, direct-print utility program 21c, when being executed, may cause display and operation unit 27 to display a print setup screen that allows an operator to specify, through display and operation unit 27, the way to divide the document in the PDF data into page pieces (the page-division direction that is a direction in which the document is to be divided into page pieces) and a layout to be used for printing a certain number of the page pieces in a grid per sheet of printing media. The information specified on the screen is written into print settings, and is added to the PDF data, by direct-print utility program 21c. As needed, direct-print utility program 21c, when being executed, may cause display and operation unit 27 to display a selection screen that prompts an operator to make, through display and operation unit 27, a selection whether to adjust the layout specified for the document. The operator's selection specified on the screen is written into print settings, and is added to the PDF data, by direct-print utility program 21c.

Storage unit 25 stores programs which, when being executed, cause CPU 22 to control various components of client terminal 20; PDF data; and other data. Examples of storage unit 25 include flash memories and SD (Secure Digital) cards.

Network interface unit 26 includes a NIC (Network Interface Card) and/or a modem. Network interface unit 26 communicably connects at least one client terminal 20 to communication network 50 (for example, connects client terminal 20 to an access point of the network by using a wireless connection) so as to send PDF data or a print job to printing device 30. Network interface unit 26 may support Bluetooth technologies so as to directly communicate with printing device 30 by using a wireless connection, where Bluetooth is a registered trademark or trademark of BLUETOOTH SIG, INC. in the United States and/or other countries.

Display and operation unit 27 is configured to display various screens including a web-browsing screens of applications 21b (a web browser) and, if needed, a print setup screen, and to allow an operator to perform various kinds of operations, such as operations for creating PDF data and operations for instructing to perform direct printing, on the screens. Examples of the display and operation unit 27 include a touch screen in which an operation unit that works as an input device (a resistive touch sensor composed of lattice-shaped transparent electrodes or a capacitive touch sensor) is arranged on a display unit, like a LCD (liquid crystal display) or an OEL (organic electroluminescence) display. In the present embodiment, a touch screen, in which a display unit and an operation unit are housed in one body, is employed as an instance of display and operation unit 27, but alternatively, a display unit and an operation unit as separated bodies may be employed as an instance of display and operation unit 27.

As illustrated in FIG. 3B, built-in controller 21 is configured to execute direct-print utility program 21c to send print instructions to printing device 30, but alternatively, built-in controller 21 may be configured to execute a printer driver to send print instructions to printing device 30. In this case, the printer driver, when being executed, causes built-in controller 21 to convert PDF data created by using the PDF creation capability of OS 21a into a print job, where examples of the print job include PDL (Page Description Language) data written in page description languages, such as PJL (Printer Job Language), PS (PostScript) and PCL (Printer Control Language); and PDF (Portable Document Format) data. As needed, the printer driver, when being executed, may cause display and operation unit 27 to display a print setup screen that allows an operator to specify the way to divide a document of the print job into page pieces (the page-division direction that is a direction in which the document is to be divided into page pieces) and a layout to be used for printing a certain number of the page pieces in a grid per sheet of printing media. The information specified on the screen is written into print settings, and is added to the print job, by the printer driver. As needed, the printer driver, when being executed, may cause display and operation unit 27 to display a selection screen that prompts an operator to make a selection whether to adjust the layout specified for the document, through display and operation unit 27. The operator's selection specified on the screen is written into print settings, and is added to the print job, by the printer driver. As needed, the printer driver, when being executed, may cause built-in controller 21 to perform the following operations, in response to receiving operator's instructions to adjust the layout specified for the document of the print job. Built-in controller 21 checks the way to divide a document of the print job into page pieces (the page-division direction) and a layout to be used for printing a certain number of the page pieces in a grid per sheet of printing media. If, in the layout, fields for the page pieces in the layout are arranged in two or more lines extending in the page-division direction, built-in controller 21 adjusts the layout to merge the fields for the page pieces so as to reduce the number of the two or more lines to one. The information of the adjusted layout is written into print settings, and is added to the print job, by the printer driver. After the adjustment, there is no need to adjust the layout specified for the document, on printing device 30.

The present embodiment presents the adjustment of the layout to be used for printing a certain number of page pieces of a document in a grid per sheet of printing media, but the adjustment may be used for displaying the document on a device. In this case, one of applications 21b, when being executed, may cause display and operation unit 27 to display a display setup screen that allows an operator to specify the way to divide a document to be displayed (the page-division direction) and a layout to be used for displaying a certain number of the page pieces that form one page. One of applications 21b, when being executed, may cause display and operation unit 27 to display a selection screen that prompts an operator to make a selection whether to adjust the layout specified for the document, thorough display and operation unit 27. As needed, one of applications 21b, when being executed, may cause built-in controller 21 to perform the following operations, in response to receiving operator's instructions to adjust the layout specified for the document. Built-in controller 21 checks the layout and, if, in the layout, fields for the page pieces in the layout are arranged in two or more lines extending in the page-division direction, adjusts the layout to merge the fields for the page pieces so as to reduce the number of the two or more lines to one. Built-in controller 21 then causes display and operation unit 27 to display the document according to the adjusted layout.

Printing Device:

Printing device 30 is configured to print PDF data (or a print job) received from client terminal 20. The printing device 30 includes, as illustrated in FIG. 4A, built-in controller 31, storage unit 35 and network interface (I/F) unit 36, display and operation unit 37, and printing unit 38.

Built-in controller 31 includes CPU 32, and memories including ROM 33 and RAM 34. CPU 32 reads out control programs stored in ROM 33 or storage unit 35, loads the programs onto RAM 34, and executes the programs, thereby controlling operations of the components of printing device 30. As illustrated in FIG. 4B, built-in controller 31 (CPU 32) is configured to work as information obtainer 31a, layout adjuster 31b and image processor 31c.

Information obtainer 31a is configured to perform the following operations. Information obtainer 31a obtains and analyzes the PDF data, and obtains the vertical size and the horizontal size of the document of the PDF data (referred to as the document sizes). Information obtainer 31a checks print settings added to the PDF data to further obtain information specified for the document: the way to divide the document into page pieces (the page-division direction that is a direction in which the document is to be divided into page pieces) and the layout to be used for printing a certain number of the page pieces in a grid per sheet of printing media. The page-division direction and the layout may be obtained by information obtainer 31a from print settings added to the PDF data, or may be defined by information obtainer 31a on the basis of the document sizes. For example, if the PDF data presents a document elongated in the vertical direction, information obtainer 31a may determine that the document is to be divided by one or more horizontal dividing lines; and information obtainer 31a may further determine the layout, by using the comparison between the vertical size and horizontal size of a sheet of printing paper and the vertical size and horizontal size of the document, or determine the layout, by calculating the magnification ratio of the document so that readers can read all the contents (characters) in the document comfortably, on the basis of information about the contents of the document in the PDF data (for example, the size of characters) and by determining the layout so that the page pieces can be printed in the magnification ratio on one sheet.

Layout adjuster 31b is configured to perform the following operations. Layout adjuster 31b checks the layout specified for the document, and judges whether fields for the page pieces in the layout are arranged in two or more lines extending in the page-division direction (two or more rows, in the case that the document is to be divided by one or more horizontal lines; or two or more columns, in the case that the document is to be divided by one or more vertical lines). When judging that the fields for the page pieces are arranged in two or more lines extending in the page-division direction, layout adjuster 31b adjusts the layout so as to merge the fields for the page pieces in the layout to reduce the number of the lines in the layout to one. In an example that the document is to be divided into page pieces horizontally (to be divided by one or more horizontal dividing lines), layout adjuster 31b judges whether the layout has two or more rows of the fields for the page pieces. Judging that the layout has two or more rows of the fields for the page pieces, layout adjuster 31b adjusts the layout so as to reduce the number of the rows in the layout to one. In another example that the document is to be divided into page pieces vertically (to be divided by one or more vertical dividing lines), layout adjuster 31b judges whether the layout has two or more columns of the fields for the page pieces. Judging that the layout has two or more columns of the fields for the page pieces, layout adjuster 31b adjusts the layout so as to reduce the number of the columns in the layout to one. Before adjusting the layout, layout adjuster 31b causes, as needed, display and operation unit 37 to display the selection screen that prompts an operator to make a selection whether to adjust the layout specified for the document, through display and operation unit 37. In response to receiving the operator's selection made on display and operation unit 37, layout adjuster 31b adjusts the layout so as to reduce the number of the lines of the fields for the page pieces, extending in the page-division direction, to one.

Image processor 31c serves as a RIP (raster image processor) and is configured to perform the following operations. Image processor 31c rasterizes PDF data or a print job, and creates print data for printing a certain number of page pieces, which are given by a division of the document of the PDF data or print job, per sheet of printing media, according to the given layout (the adjusted layout, in case that the layout has been adjusted; or the layout originally specified for the document, in case that the layout has not been adjusted). Image processor 31c then outputs the created print data to printing unit 38 to instruct the printing unit 38 to print the print data, and/or outputs the created print data to display and operation unit 37 to instruct display and operation unit 37 to display a print preview screen showing the document.

The information obtainer 31a, layout adjuster 31b and image processor 31c may be constituted as hardware devices. Alternatively, the information obtainer 31a, layout adjuster 31b and image processor 31c may be provided by a print control program which causes built-in controller 31 to function as these components when being executed by CPU 32. That is, built-in controller 31 may be configured to serve as the information obtainer 31a, layout adjuster 31b and image processor 31c, when CPU 32 executes the print control program.

Storage unit 35 is a non-transitory computer-readable recording medium including a HDD (Hard Disk Drive) and/or a SSD (Solid State Drive), which stores programs which when being executed causes CPU 32 to control the components of printing device 30, PDF data (or a print job) received from client terminal 20; print data created by image processor 31c; and other data.

Network interface unit 36 includes a NIC and/or a modem. Network interface unit 36 communicably connects printing device 30 to communication network 50 so as to receive PDF data (or a print job) from client terminal 20. Network interface unit 36 may support Bluetooth technologies so as to directly communicate with client terminal 20 by using a wireless connection.

Display and operation unit 37 is configured to display various screens relating to printing (particularly, a selection screen that prompts an operator to make a selection whether to adjust the layout specified for the one-page document), and to allow an operator to perform various kinds of operations relating to printing (particularly, a selection whether to adjust the layout specified for the one-page document) on the screens. Examples of the display and operation unit 37 include a touch screen in which an operation unit that works as an input device (a resistive touch sensor composed of lattice-shaped transparent electrodes or a capacitive touch sensor) is arranged on a display unit like a LCD (liquid crystal display) or an OEL (organic electroluminescence) display. In the present embodiment, a touch screen, in which a display unit and an operation unit are housed in one body, is employed as an instance of display and operation unit 37, but a display unit and an operation unit as separated bodies may be employed as an instance of display and operation unit 37.

Printing unit 38 is a print engine configured to form images based on print data onto sheets of printing media fed by a feeder, and output printed sheets to a paper ejection unit. Printing unit 38 includes, for example, an exposure unit, an image forming unit, an intermediate transfer belt, a secondary transfer roller and a fixing unit. The exposure unit is configured to irradiate a photoreceptor drum with a laser beam in accordance with print data, to perform exposure processing. The image forming unit includes photoreceptor drums, developing units, charging units, photoreceptor cleaning units, and primary transfer rollers, and is configured to form a toner image in each color of C, M, Y, and K.

The intermediate transfer belt is rotated by rollers and functions as an intermediate transfer body to convey toner images formed by the image forming unit to printing media. The secondary transfer roller transfers toner images formed on the intermediate transfer belt onto the printing media. The fixing unit fixes toner images transferred onto the printing media.

It should be noted that FIG. 1 to FIG. 4B illustrated an example of printing system 10 according to the present embodiment for illustrative purpose only, and the constitution and operations of each apparatus in the system may be modified appropriately, as far as the above-described operations can be executed in the system.

For example, the above-described printing system 10 employs printing device 30 configured to control print processing (in other words, printing device 30 including built-in controller 31 that serves as a print controller), but alternatively, printing system 10 may employ controller 40 that serves as a print controller separately from printing device 30, as illustrated in FIG. 2. In this case, a built-in controller of controller 40 may be configured to work as the information obtainer, the layout adjuster and the image processor (particularly, the information obtainer and the layout adjuster), in place of built-in controller 31 of printing device 30, when the print control program is executed by the CPU of the controller 40. As another example, printing system 10 may employ client terminal 20 that serves as a print controller. In this case, built-in controller 21 of client terminal 20 may be configured to work as the information obtainer, the layout adjuster and the image processor (particularly, the information obtainer and the layout adjuster), in place of built-in controller 31 of printing device 30, when the print control program is executed by CPU 20 of client terminal 20.

Control of Print Processing:

Hereinafter, a description is given of a print control method for use in printing system 10 having the above-described construction. In a case of using the four-in-one layout for print processing, as illustrated in FIG. 5, a sheet of printing media has a printable area where one page is to be printed (the area surrounded by the broken line in FIG. 5), and four fields for logical pages (four fields surrounded by the solid lines) are laid out within the printable area of the sheet of printing media, with blank spaces located between the fields. In the print control method, a page of a one-page document is divided into page pieces and four page pieces are printed within the respective fields in each sheet. In FIG. 5, the horizontal size and the vertical size of the printable area of a sheet of printing media are represented by L11 and L12, respectively, and the horizontal size and the vertical size of the fields for logical pages are represented by L21 and L22, respectively.

FIG. 6 illustrates an example of the print control method. In printing a one-long-page document (see the original document in FIG. 6) by dividing the page of the document into multiple page pieces horizontally (or vertically) and printing a certain number of the page pieces per sheet of printing media, built-in controller 31 of printing device 30 performs the following processes. Built-in controller 31 checks the page-division direction that is a direction in which the document is to be divided into page pieces, and the layout to be used for printing a certain number of the page pieces in a grid (with m rows and n columns) per sheet of printing media (see the layout in FIG. 6), both specified for the document (ST1 in FIG. 6), and judges whether fields for the page pieces in the layout are arranged in two or more lines extending in the page-division direction. In concrete terms, in a case that the page of the document is specified to be divided horizontally (to be divided by one or more horizontal dividing lines at one or more dividing positions located along the vertical side of the page of the document), built-in controller 31 judges whether fields for the page pieces in the layout are arranged in two or more rows; and in another case that the page of the document is specified to be divided vertically (to be divided by one or more vertical dividing lines at one or more dividing positions located along the horizontal side of the page of the document), built-in controller 31 judges whether fields for the page pieces in the layout are arranged in two or more columns. Judging that the fields for the page pieces in the layout are arranged in two or more lines extending in the page-division direction, built-in controller 31 merges the fields in the layout and adjusts the layout so as to reduce the number of the lines to one (ST2 in FIG. 6). In the example of FIG. 6, the page of the document is specified to be divided horizontally into page pieces and to be printed in the four-in-one layout (with two rows and two columns). Since the layout has two rows, built-in controller 31 merges the fields for page pieces in the layout and adjusts the layout so as to reduce the number of the rows of the fields to one (in other words, to create the two-in-one layout) (see the adjusted layout in FIG. 6). Built-in controller 31 then divides the page of the document horizontally into page pieces by using the aspect ratio of the fields for page pieces in the adjusted layout so as fit the page pieces to the respective fields in the adjusted layout (ST3 in FIG. 6). In the example of FIG. 6, the page of the document is divided horizontally at the page-dividing position (indicated in the broken line in FIG. 6) into two page pieces, according to the aspect ratio of the fields for page pieces in the adjusted layout (see the crossing arrows in the adjusted layout and the divided document in FIG. 6). Built-in controller 31 then creates print data (see print data 1 in FIG. 6) composed of two pages (P1 and P2) given by the division of the page of the original document by using the aspect ratio, together with print settings that specify to use the two-in-one layout (the adjusted layout) for printing the print data (ST4 in FIG. 6), or creates print data (see print data 2 in FIG. 6) composed of one page in which page pieces given by the division of the page of the document by using the aspect ratio are arranged in the two-in-one layout (the adjusted layout) (ST5 in FIG. 6). With these processes, blank spaces located between the printed page pieces are reduced and the readability of the printed document is enhanced.

Hereinafter, a description is given of operations of printing device 30 according to the present embodiment in details. CPU 32 reads out a print control program stored in ROM 33 or storage unit 35, loads the program onto RAM 34, and executes the program, thereby performing the processing of the steps illustrated in the flowchart of FIG. 7.

First, built-in controller 31 (information obtainer 31a) of printing device 30 obtains input data that presents a one-page document (PDF data or a print job), from client terminal 20 (Step S101), and checks print settings specified for the input data, to judge whether there is an instruction to divide the page of the document (Step S102). Judging that there is no instruction to divide the page of the document, built-in controller 31 (image processor 31c) creates print data according to the page of the document presented by the input data (Step S103).

Judging that there is an instruction to divide the page of the document, built-in controller 31 (information obtainer 31a) analyzes the input data, to obtain the sizes of the document presented by the input data (Step S104). Built-in controller 31 (information obtainer 31a) then checks the print settings, to obtain information about the way to divide the document (the page-division direction) and the layout of page pieces to be printed on one sheet, both specified to the document (Steps S105 and S106), and judges whether there is an instruction to print multiple page pieces per sheet (N-in-one printing) (Step S107). Judging that there is no instruction to print multiple page pieces per sheet (NO in Step S107), built-in controller 31 goes to Step S111.

Judging that there is an instruction to print multiple page pieces per sheet (YES in Step S107), built-in controller 31 (layout adjuster 31b) judges whether fields for the page pieces in the layout are arranged in two or more lines extending in the page-division direction (Step S108). Judging that the fields are arranged in one line extending in the page division direction in the layout (NO in Step S108), there is no need to adjust the layout and built-in controller 31 goes to Step S111.

Judging that fields for the page pieces in the layout are arranged in two or more lines extending in the page-division direction (YES in Step S108), built-in controller 31 (layout adjuster 31b), as needed, causes display and operation unit 37 to display the selection screen that prompts an operator to make a selection whether to adjust the layout specified for the document, through display and operation unit 37 (Step S109). In response to the operator's selection not to adjust the layout, made on display and operation unit 37 (NO in Step S109), built-in controller 31 goes to Step S111. In response to the operator's selection to adjust the layout, made on display and operation unit 37 (YES in Step S109), built-in controller 31 (layout adjuster 31b) merges the fields for logical pages (page pieces) in the layout and adjusts the layout so as to reduce the number of the lines of the fields extending in the page-division direction (rows or columns) in the layout to one (Step S110).

After that, built-in controller 31 (image processor 31c) uses the aspect ratio of the fields for logical pages (page pieces) in the given layout, to calculate a position or positions (a dividing position or positions) to divide the document by a dividing line or lines (Step S111). Built-in controller 31 (image processor 31c) then divides the document into multiple page pieces on the basis of the dividing position or positions (Step S112), and creates print data on the basis of the given page pieces and the given layout (Step S113).

FIGS. 8A and 8B are schematic diagrams illustrating examples of the original layout to be used for printing a certain number of the page pieces in a grid per sheet of printing media, and FIG. 8C is a schematic diagram illustrating an example of the layout after the adjustment. In the case that built-in controller 31 judges that there is an instruction to print multiple page pieces per sheet in Step S107, and the original layout specified for the document, includes a fields for the first logical page (page piece) located at the top left, a field for the second logical page (page piece) located at the top right, a fields for the third logical page (page piece) located at the bottom left, and a fields for the fourth logical page (page piece) located at the bottom right as illustrated in FIG. 8A (or a field for the first logical page located at the top left, a field for the second logical page located at the bottom left, a field for the third logical page located at the top right, and a field for the fourth logical page located at the bottom right as illustrated in FIG. 8B), built-in controller 31 judges that the fields in the layout are arranged in two or more lines extending in the page-division direction (in two horizontal lines or two rows) in Step S108. Therefore, built-in controller 31 merges the fields arranged in each vertical line in the layout and adjusts the layout so as to reduce the number of lines of the fields extending in the page division direction (the number of rows of the fields) in the layout to one, as illustrated in FIG. 8C, in Step S110.

The present embodiment gave the print control operations of printing device 30 in which the four-in-one layout has been originally specified for a one-page document, but the operations are applicable also to print processing in which another type of layout has been originally specified for a one-page document. For example, in print processing in which the six-in-one layout (with three rows and two columns) has been originally specified for a one-page document, built-in controller 31 may merge the fields for logical pages (page prices) in the layout and adjust the layout so as to reduce the number of rows (or columns) of the fields to one. In another print processing in which the nine-in-one layout (with three rows and three columns) has been originally specified for a one-page document, built-in controller 31 may merge the fields for logical pages (page prices) in the layout and adjust the layout so as to reduce the number of rows (or columns) of the fields to one.

FIG. 9 is a diagram illustrating effects of the print control method according to the present embodiment, by using print processing of an original document containing one page elongated in the vertical direction (see D0 in FIG. 9). When the page of the original document is divided into page pieces and printed by using the four-in-one layout, the vertical size of the page pieces is determined on the basis of the aspect ratio of the fields for logical pages (page pieces) in the layout. As a result, the page of the original document is divided into five page pieces and the page pieces are printed over two sheets (the first to fourth page pieces are printed on the first page and the fifth page piece is printed on the second page, as illustrated by D1 in FIG. 9). On the other hand, when the same print processing is performed according to the print control method of the present embodiment, the four-in-one layout is adjusted as follows. That is, the fields arranged in each vertical line in the layout are merged to form vertical fields each having the vertical size same as that of the printable area of a sheet of printing media. When the page of the original document is divided into page pieces and printed using the adjusted layout, the vertical size of the page pieces is determined on the basis of aspect ratio of the vertical fields in the adjusted layout. As a result, the page of the original document is divided into two page pieces and all the page pieces are printed on one sheet (as illustrated by D2 in FIG. 9). According to the above-described layout adjustment, the blank spaces located between the fields for logical pages in the original layout are merged into the vertical fields in the adjusted layout, which enlarges the total areas where the contents of a page can be printed, on each sheet.

Second Embodiment

Figure 10B:
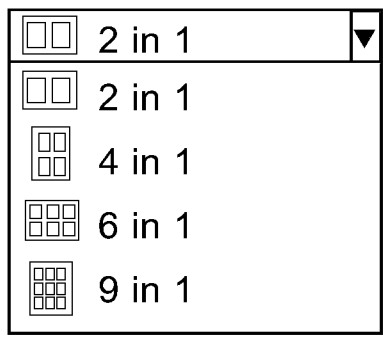
Figure 10C:
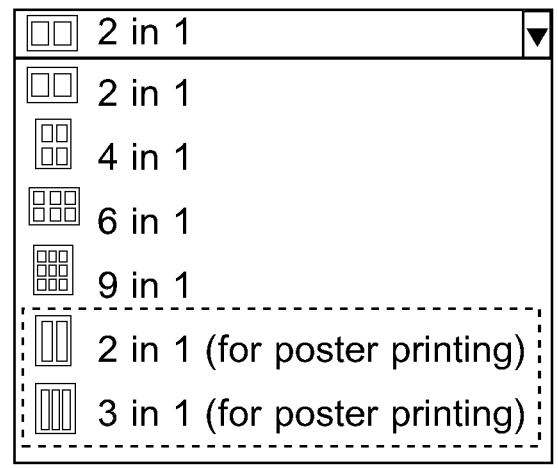

Next, a description is given of a computing device, a non-transitory computer-readable recording medium storing a print control program and a print control method according to the second embodiment, with reference to FIGS. 10A to 10C. FIGS. 10A to 10C are diagrams illustrating an example of a print setup screen to be displayed on a client terminal according to the present embodiment.

The first embodiment gave the operations to create PDF data (or a print job) to be subjected to the combination of poster printing and printing multiple page pieces per sheet, and then adjust the layout to be used for printing the page pieces, specified for the PDF data (the print job). Alternatively, PDF data (or a print job) for which the adjusted layout has been specified, can be created when an operator configures print settings on print setup screen 60 displayed by printer driver on the operator's computing device as illustrated in FIG. 10A.

In this case, the creation of a print job (PDF data) can be realized by printing system 10 having the construction described in the first embodiment, but built-in controller 21 of client terminal 20 (or a computing devise in printing system 10) is further configured to perform the following operations, by executing the printed driver, when an operator specifies settings for printing multiple page pieces per sheet on print setup screen 60. That is, built-in controller 21 checks candidates for the layout, which can be used for printing a one-page document; and when finding a layout in which fields for logical pages (page pieces) are arranged in two or more lines extending in the page division direction (rows or columns), adjusts the layout so as to reduce the number of the lines of the fields to one. Built-in controller 21 then causes display and operation unit 27 to display print setup screen 60 that allows an operator to specify the layout the for the document, through display and operation unit 27, wherein the screen shows the adjusted layout together with the candidates for the layout which can be used for printing the document, so that the operator can select one of the candidates. Built-in controller 21 then uses the selected layout, to create a print job which gives instructions to print a certain number of page pieces, given by a division of the document, per sheet of printing media; and outputs the created print job.

For example, in ordinal N-in-one printing, print setup screen 60 shows the following candidates for the N-in-one layout to be used for the printing, as illustrated in FIG. 10B; two-in-one layout for printing two pages that are taller than wide and arranged in one row and two columns on a landscape-oriented sheet, four-in-one layout for printing four pages that are taller than wide and arranged in two rows and two columns on a portrait-oriented sheet, six-in-one layout for printing six pages that are taller than wide and arranged in two rows and three columns on a landscape-oriented sheet and nine-in-one layout for printing nine pages that are taller than wide and arranged in three rows and three columns on a portrait-oriented sheet. In the present embodiment, print setup screen 60 shows additional candidates for the N-in-one layout to be used for the printing (candidates each prepared by adjusting another candidate, as described above); two-in-one layout for printing two pages (page pieces) that are taller than wide and arranged in one row and two columns on a portrait-oriented sheet (two-in-one layout for poster printing), and three-in-one layout for printing three pages (page pieces) that are taller than wide and arranged in one row and three columns on a portrait-oriented sheet (three-in-one layout for poster printing), additionally to the above-described two-in-one, four-in-one, six-in-one and nine-in-one layouts, as illustrated in FIG. 10C.

As described above, client terminal 20 according to the present embodiment (a computing device for creating a print job for printing a one-page document by using page pieces, which are given by a division of a one-page document, to print a certain number of the page pieces in a grid per sheet of printing media) is configured as follows. That is, client terminal 20, when executing the print control program, displays print setup screen 60 that allows an operator, through an input device of client terminal 20, to specify a layout to be used for printing a one-page document by using page pieces, which are given by a division of the one-page document, to print a certain number of the page pieces in a grid per sheet of printing media. Print setup screen 60 shows candidates for the layout so that the operator can select through the input device one of the candidates as the layout to be used for printing the one-page document, and the candidates include a candidate prepared by adjusting another candidate, which is a layout in which fields for the page pieces are arranged in two or more lines extending in the page-division direction so as to reduce the number of the one or more lines in the layout to one. After the operator's selection of the layout made through the input device, client terminal 20 uses the selected layout, to create a print job for printing a certain number of page pieces, which are given by a division of the document, per sheet of printing media, and outputs the print job. It allows creation of a print job for which adjustment of the layout has been done, and there is no need for the operator to adjust the layout, on printing device 30. It enhances user friendliness of printing system 10.

The present invention should not be limited to the above-described embodiments and examples, and the constitution and control may be modified appropriately, unless such modification deviates from the intention of the present invention.

For example, the above-described embodiments gave print control operations using PDF data created from a web page, but alternatively, the print control operations and the print control method according to the embodiments can be similarly used for print control operations using PDF data presenting an arbitrary one-page document containing a page being taller than wide or wider than tall.

For another example, the above-described embodiments gave print control operations using PDF data, but alternatively, the print control operations and the print control method according to the embodiments can be similarly used for print control operations using an arbitrary type of data presenting a document.

The present invention is applicable to print controllers for controlling print processing that divides the contents of a one-page document into multiple page pieces and prints a certain number of the page pieces per sheet, print control programs, non-transitory computer-readable recording media each storing the print control program, and print control methods for use in a printing system.

Although embodiments of the present invention have been described and illustrated in detail, it is clearly understood that the same is by way of illustration and example only and not limitation, the scope of the present invention should be interpreted by terms of the appended claims

The invention claimed is:

1. A print controller for controlling print processing that divides a one-page document into a plurality of page pieces and causes a print engine to print a certain number of the page pieces in a grid per sheet of printing media, the print controller comprising:
a hardware processor; and
a storage unit operatively connected to the hardware processor, storing a computer-readable program comprising instructions which, when executed by the hardware processor, cause the hardware processor to perform operations comprising:
in response to receiving data of a one-page document, analyzing the data to obtain vertical size and horizontal size of the one-page document, and print settings specified for the one-page document, the print settings including a page-division direction that is a direction in which the one-page document is to be divided into page pieces, and a layout to be used for printing a certain number of the page pieces in a grid per sheet of printing media;
performing a layout adjustment including
judging whether fields for the page pieces in the layout are arranged in two or more lines extending in the page-division direction, and
on judging that the fields are arranged in two or more lines extending in the page-division direction, adjusting the layout so as to reduce the number of the two or more lines in the layout to one, to create an adjusted layout; and
according to the adjusted layout, creating print data for printing a certain number of page pieces, which are given by a division of the one-page document, per sheet of printing media, to output the print data.

2. The print controller of claim 1,
wherein the creating print data includes,
calculating an aspect ratio of the fields for the page pieces in the adjusted layout,
determining positions to divide the one-page document into page pieces, on the basis of the aspect ratio, and
dividing the one-page document at the positions, to create the print data.

3. The print controller of claim 1,
wherein the print controller further comprises a display and an input device, and
the layout adjustment includes
causing the display to display a selection screen that prompts an operator to make through the input device a selection whether to adjust the layout specified for the one-page document, and
in response to receiving the operator's selection made through the input device, performing the adjusting the layout.

4. The print controller of claim 1,
wherein the analyzing includes specifying one or both of the page-division direction and the layout, for the one-page document, by using the vertical size and the horizontal size of the one-page document.

5. The print controller of claim 1,
wherein the data of the one-page document is PDF data created from a web page.

6. A non-transitory computer-readable recording medium storing a print control program to be executed in a printing system including a print controller for controlling print processing that divides a one-page document into a plurality of page pieces and causes a print engine to print a certain number of the page pieces in a grid per sheet of printing media, the program comprising instructions which, when executed by a hardware processor of the print controller, cause the hardware processor to perform operations comprising:
in response to receiving data of a one-page document, analyzing the data to obtain vertical size and horizontal size of the one-page document, and print settings specified for the one-page document, the print settings including a page-division direction that is a direction in which the one-page document is to be divided into page pieces, and a layout to be used for printing a certain number of the page pieces in a grid per sheet of printing media;
performing a layout adjustment including
judging whether fields for the page pieces in the layout are arranged in two or more lines extending in the page-division direction, and on judging that the fields are arranged in two or more lines extending in the page-division direction, adjusting the layout so as to reduce the number of the two or more lines in the layout to one, to create an adjusted layout; and according to the adjusted layout, creating print data for printing a certain number of page pieces, which are given by a division of the one-page document, per sheet of printing media, to output the print data.

7. The non-transitory computer-readable recording medium of claim 6, wherein the creating print data includes, calculating an aspect ratio of the fields for the page pieces in the adjusted layout, determining positions to divide the one-page document into page pieces, on the basis of the aspect ratio, and dividing the one-page document at the positions, to create the print data.

8. The non-transitory computer-readable recording medium of claim 6, wherein the printing system further comprises a display and an input device, and the layout adjustment includes causing the display to display a selection screen that prompts an operator to make through the input device a selection whether to adjust the layout specified for the one-page document, and in response to receiving the operator's selection made through the input device, performing the adjusting the layout.

9. The non-transitory computer-readable recording medium of claim 6, wherein the analyzing includes specifying one or both of the page-division direction and the layout, for the one-page document, by using the vertical size and the horizontal size of the one-page document.

10. The non-transitory computer-readable recording medium of claim 6, wherein the data of the one-page document is PDF data created from a web page.

11. A print control method for use in a printing system including a print controller for controlling print processing that divides a one-page document into a plurality of page pieces and causes a print engine to print a certain number of the page pieces in a grid per sheet of printing media, the method comprising:

in response to receiving data of a one-page document, analyzing, by a hardware processor of the print controller, the data to obtain vertical size and horizontal size of the one-page document, and print settings specified for the one-page document, the print settings including a page-division direction that is a direction in which the one-page document is to be divided into page pieces, and a layout to be used for printing a certain number of the page pieces in a grid per sheet of printing media;

performing a layout adjustment by the hardware processor, including judging whether fields for the page pieces in the layout are arranged in two or more lines extending in the page-division direction, and on judging that the fields are arranged in two or more lines extending in the page-division direction, adjusting the layout so as to reduce the number of the two or more lines in the layout to one, to create an adjusted layout; and according to the adjusted layout, creating, by the hardware processor, print data for printing a certain number of page pieces, which are given by a division of the one-page document, per sheet of printing media, to output the print data.

12. The print control method of claim 11, wherein the creating print data includes, calculating an aspect ratio of the fields for the page pieces in the adjusted layout, determining positions to divide the one-page document into page pieces, on the basis of the aspect ratio, and dividing the one-page document at the positions, to create the print data.

13. The print control method of claim 11, wherein the printing system further comprises a display and an input device, and the layout adjustment includes causing the display to display a selection screen that prompts an operator to make through the input device a selection whether to adjust the layout specified for the one-page document, and in response to receiving the operator's selection made through the input device, performing the adjusting the layout.

14. The print control method of claim 11, wherein the analyzing includes specifying one or both of the page-division direction and the layout, for the one-page document, by using the vertical size and the horizontal size of the one-page document.

15. The print control method of claim 11, wherein the data of the one-page document is PDF data created from a web page.

* * * * *